(12) United States Patent
Mancuso, Jr.

(10) Patent No.: US 9,314,013 B2
(45) Date of Patent: Apr. 19, 2016

(54) TOTE FOR DRAGGING TAKEN GAME

(71) Applicant: Joseph R Mancuso, Jr., Lagrange, OH (US)

(72) Inventor: Joseph R Mancuso, Jr., Lagrange, OH (US)

( * ) Notice: Subject to any disclaimer, the term of this patent is extended or adjusted under 35 U.S.C. 154(b) by 118 days.

(21) Appl. No.: 13/987,039

(22) Filed: Jun. 27, 2013

(65) Prior Publication Data

US 2015/0001868 A1    Jan. 1, 2015

Related U.S. Application Data

(63) Continuation-in-part of application No. 29/442,319, filed on Feb. 4, 2013, now Pat. No. Des. 690,388.

(60) Provisional application No. 61/849,855, filed on Feb. 4, 2013.

(51) Int. Cl.
*B65G 7/12* (2006.01)
*A01M 31/00* (2006.01)

(52) U.S. Cl.
CPC ..................................... *A01M 31/006* (2013.01)

(58) Field of Classification Search
USPC ................. 294/137, 165, 151, 152, 157, 153; 248/61, 68.1, 74.4; 452/189
See application file for complete search history.

(56) References Cited

U.S. PATENT DOCUMENTS

| | | | |
|---|---|---|---|
| 115,691 A | 6/1871 | Brent | 119/861 |
| 738,983 A | 9/1903 | Burdick | 70/16 |
| 1,536,551 A | 5/1925 | Young | 119/819 |
| 1,652,351 A * | 12/1927 | Dyer | 24/129 R |
| 3,038,644 A | 6/1962 | Johnson | 224/184 |
| 3,039,159 A * | 6/1962 | Burke | 24/298 |
| 3,096,010 A * | 7/1963 | Rasmussen | 224/250 |
| 4,132,427 A | 1/1979 | McGee | 280/19 |
| 4,243,164 A | 1/1981 | Burlison et al. | 224/52 |
| 4,351,169 A | 9/1982 | Plymale | 70/16 |
| 4,638,764 A | 1/1987 | Anderson | 119/96 |
| 4,813,731 A * | 3/1989 | Smith | 294/82.33 |
| 4,828,307 A | 5/1989 | Sokol et al. | 294/79 |
| 4,854,138 A | 8/1989 | Charland | 70/16 |
| D312,164 S | 11/1990 | Pierotti | D34/28 |
| 5,083,372 A * | 1/1992 | Polutnik et al. | 29/464 |
| D333,695 S * | 3/1993 | Gatto et al. | D22/199 |
| 5,316,356 A | 5/1994 | Nutting | 294/118 |
| 5,351,365 A * | 10/1994 | Hauck | 294/15 |
| 5,382,064 A | 1/1995 | Blais | 294/26 |
| 5,461,890 A | 10/1995 | LeFavor | 70/16 |
| 5,462,019 A * | 10/1995 | Hong-Rong et al. | 119/795 |
| 5,794,897 A * | 8/1998 | Jobin et al. | 248/74.4 |
| 5,848,816 A | 12/1998 | Hancock | 294/15 |
| 5,901,999 A | 5/1999 | Brock | 294/153 |
| 5,951,080 A | 9/1999 | Wessner | 294/153 |

(Continued)

*Primary Examiner* — Paul T Chin
(74) *Attorney, Agent, or Firm* — David A. Burge

(57) ABSTRACT

A tote for dragging a game carcass has first and second identically configured rigid members that are movable toward each other to bring each of two side-by-side recesses defined by one of the members into alignment with a different one of the recesses defined by the other of the members when the members are urged toward engagement. An alignment assisting projection carried by the one member is extensible into an opening defined by the other member. The recesses are preferably substantially semi-circular and sized to close about and grasp small regions of front or rear legs of a game carcass. A flexible tow rope or cable extends through aligned passages of the rigid members and connects with a handle. Pulling the tow rope or cable can help clamp the rigid members together.

26 Claims, 7 Drawing Sheets

(56) References Cited

U.S. PATENT DOCUMENTS

| | | | |
|---|---|---|---|
| 5,966,992 A * | 10/1999 | Kashuba | 248/231.9 |
| 6,006,968 A | 12/1999 | McCarthy et al. | 224/184 |
| 6,089,636 A | 7/2000 | Harris | 294/150 |
| 6,129,399 A | 10/2000 | Burch, Sr. | 294/153 |
| D434,199 S | 11/2000 | Alviso | D39/28 |
| 6,142,547 A | 11/2000 | Bowerman | 294/150 |
| 6,227,502 B1 * | 5/2001 | Derman | 248/74.4 |
| 6,250,699 B1 | 6/2001 | Robertson | 294/153 |
| 6,334,444 B1 | 1/2002 | Sisco | 128/869 |
| 6,360,747 B1 | 3/2002 | Velarde et al. | 128/869 |
| 6,637,242 B2 | 10/2003 | Masters | 70/16 |
| D486,879 S * | 2/2004 | Powell et al. | D22/199 |
| 6,755,454 B1 | 6/2004 | Cary | 294/150 |
| 7,125,331 B1 * | 10/2006 | Sayers | 452/189 |
| 7,484,698 B2 * | 2/2009 | Budagher | 248/68.1 |
| 7,487,565 B1 | 2/2009 | Sundling et al. | 294/153 |
| D603,014 S | 10/2009 | Rice | D22/199 |
| 7,896,416 B2 | 3/2011 | Carter | 294/167 |
| D643,991 S | 8/2011 | Miller et al. | D34/28 |
| 8,062,107 B1 | 11/2011 | Sauer | 452/197 |
| 8,292,341 B1 | 10/2012 | Sokoly | 294/152 |
| D690,388 S * | 9/2013 | Mancuso, Jr. | D22/199 |
| D701,937 S * | 4/2014 | Mancuso, Jr. | D22/199 |

* cited by examiner

TOTE FOR DRAGGING TAKEN GAME

REFERENCE TO PROVISIONAL APPLICATION

This Utility Application claims the benefit of the filing date of Provisional Application Ser. No. 61/849,855, filed Feb. 4, 2013 entitled TOTE FOR DRAGGING TAKEN GAME the disclosure of which is incorporated herein by reference.

CROSS-REFERENCE TO RELATED APPLICATIONS

The present application is filed as a continuation-in-part of Design Application Ser. No. 29/442,319 filed Feb. 4, 2013 by the inventor hereof entitled SET OF TWO IDENTICAL TOTE COMPONENTS FOR DRAGGING A GAME CARCASS, the disclosure of which is incorporated herein by reference.

REFERENCE TO SUBJECT-MATTER RELATED APPLICATION

Filed concurrently herewith by the inventor hereof is a Design Application entitled SET OF TWO IDENTICAL TOTE COMPONENTS FOR DRAGGING A GAME CARCASS, the disclosure of which is incorporated herein by reference.

BACKGROUND

When hunters shoot relatively heavy four-legged game such as deer, the need to move downed carcasses from one place to another can present a daunting problem. Such game is often taken in a remote area and must be transported to another location where vehicular transportation is available, or where the game is to be dressed. Proposals have been forthcoming for many years for various types of devices intended to assist with the transport of game carcasses from a remote location where game was downed to another location more convenient for vehicular transport or for processing.

In many instances, the preferred mode of transport from a remote area is to drag a carcass by use of a game drag device of some sort that is connected to the front or rear legs, or some other body portion of the carcass. The use of a drag device has been preferred over the alternative of simply tying a tow rope or cable to the carcass, for ropes or cables frequently come loose when a carcass becomes mired in wet or muddy ground, or becomes caught or snagged at some other location where retying the rope or cable may present difficulties.

One prior proposal of a tote for gripping leg portions of, and for towing a taken game carcass, is shown in the drawings of U.S. Pat. No. 4,243,164 issued Jan. 6, 1981 to Burlison et al, the disclosure of which patent is incorporated herein by reference.

SUMMARY

The present invention addresses the need to drag a heavy taken game carcass by providing a small, lightweight, preferably pocket sized tote having two rigid members that are designed to be clamped securely toward each other to receive, retain and grip therebetween small leg or ankle regions of a taken game carcass so the carcass can be dragged securely from one location to another by pulling on a handle of a flexible tow rope or cable that extends through aligned passages of the two rigid members which cooperate to form a main body of the tote.

In preferred practice, the two rigid members are of identical configuration, and the flexible tow rope or cable connects with the two rigid members in a way that clamps the members toward each other when one pulls on a handle connected to the flexible tow rope or cable.

In a preferred manifestation or embodiment of the tote, when the two rigid members are clamped toward each other, the recesses of one member cooperate with the recesses of the other member to receive, to grip therebetween, and to releasably retain relatively small leg or ankle portions of a taken animal carcass, thereby enabling a flexible tow rope or cable connected to the rigid members of the tote to be pulled or towed to drag the carcass from one location to another.

As used herein, the term "ankle" refers to a small or narrowed front or rear leg region of diminished size located a short distance above a hoof of a taken game carcass—a leg region that is suitable to be received in and retained by such cooperative recesses as are provided by the two rigid clamp-together members that are described herein as forming the main body of a tote that incorporates features of the present invention.

In a preferred manifestation or embodiment of the invention, a flexible tow rope or tow cable extends through aligned passages defined by the two rigid members that form the main body of a tote. An end region of the tow rope or cable is knotted or otherwise provided with an enlargement that cannot move through the aligned passages. If desired, a commercially purchased gripping device may be installed on the tow rope or cable to aid in holding the rigid members in a clamped-together position when towing force applied to the tow rope or cable is relieved.

In a preferred manifestation or embodiment of the invention, the flexibility of such portions of the tow rope or cable as may extend between the two rigid members when the members are significantly spaced apart permits the two rigid members to be turned at least a quarter turn relative to each other, which renders it easier to insert narrow ankle portions of the legs of a taken game carcass into the recesses of the rigid members before the rigid members are aligned and clamped together to grip and retain the ankle portions.

BRIEF DESCRIPTION OF THE DRAWINGS

A fuller understanding of the present invention may be had by referring to the description and claims that follow, taken in conjunction with the accompanying drawings, wherein:

DETAILED DESCRIPTION

Figure 1:
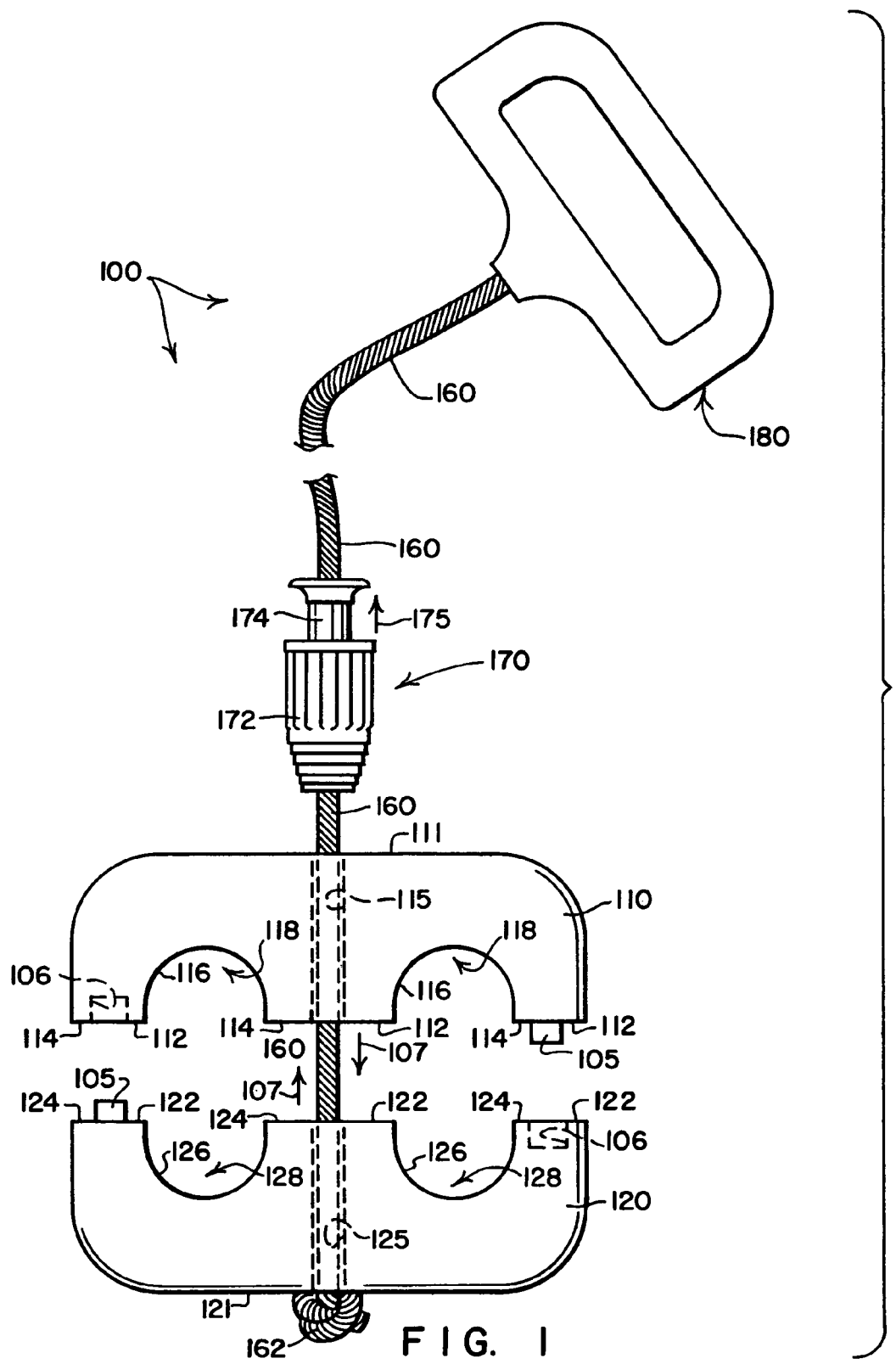
FIG. 1 is an elevational view showing one preferred embodiment of the present invention, with a flexible tow rope or cable thereof foreshortened, and with a commercially available clamping device shown installed on the tow rope of cable.
Figure 2:
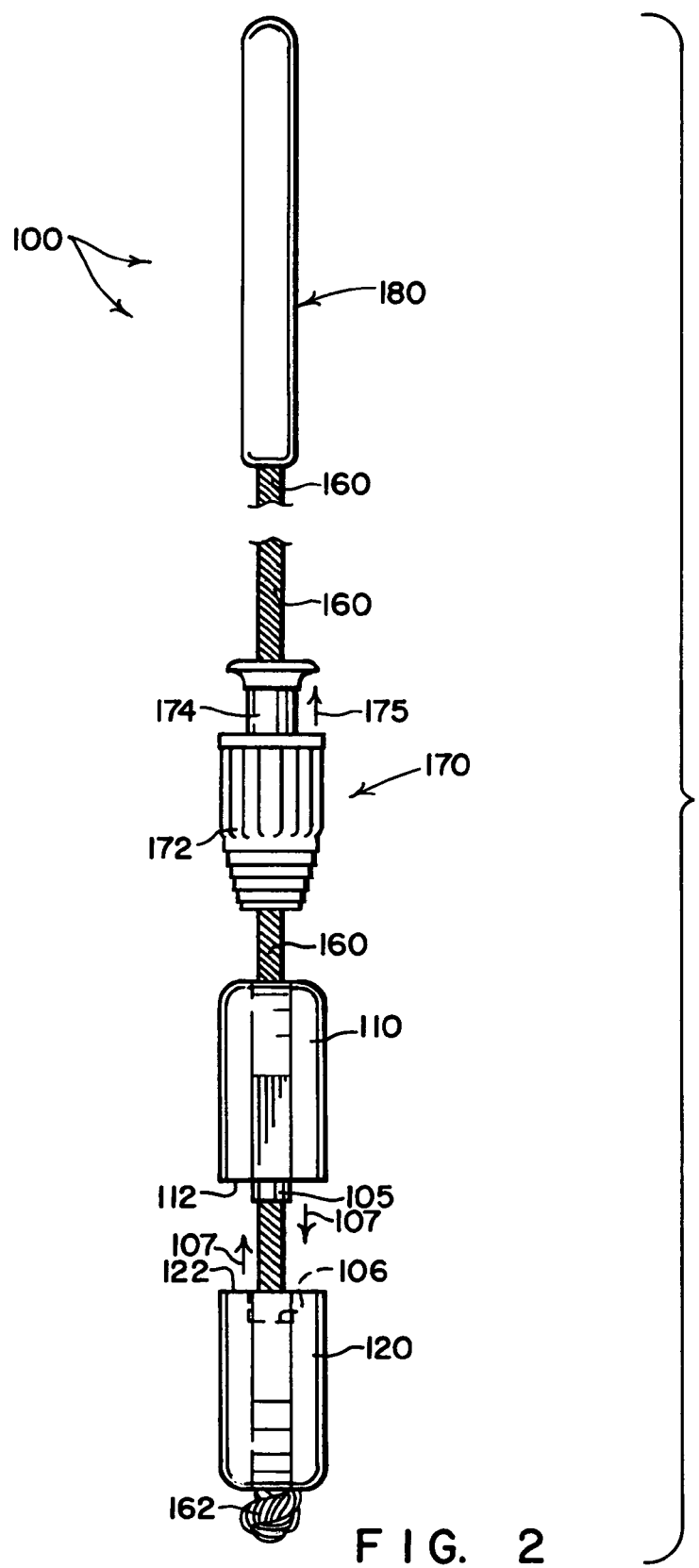
FIG. 2 is a side view thereof.

Referring to FIGS. 1 and 2, one preferred form of a tote for use in dragging a taken game carcass from one location to another is indicated generally by the numeral 100. A main body of the tote 100 includes first and second rigid members 110, 120 that are formed from a material selected to be stiff, rigid, strong and resistant to sunlight and inclement weather.

Second and third preferred forms of totes that embody features of the present invention are shown in FIGS. 3-4 and 5-6 that utilize pairs of rigid members 210, 220 and 310, 320, respectively. While the rigid members 110, 120 and 210, 220 and 310, 320 may, of course, be constructed of metal, it is preferred that they are formed from injection-molded plastics material that cooperate to provide tote bodies that are relatively light in weight and that can fit in reasonably small spaces such as one's pocket while still being capable of serving as the bodies of totes that are well suited for use with game carcasses of at least the size of deer without deforming or breaking during rugged use.

The rigid members 110, 120 of the first embodiment 100 are preferably of similar, if not completely identical, configuration. In preferred practice, the rigid members 110, 120 define what will be referred to as top and bottom surfaces 111, 121, respectively, of the body of the first embodiment 100. The rigid members 110, 120 also define surfaces 112, 122, respectively, that face toward each other. The surfaces 112, 122 have flat portions 114, 124, respectively, that are intended to extend parallel to each other, and have curved portions 116, 126 and 118, 128, respectively, that define recesses 118, 128, respectively, that are of generally U-shape, C-shape, or semi-circular shape.

The rigid members 210, 220 of the second embodiment 200 are preferably of similar, if not completely identical, configuration. In preferred practice, the rigid members 210, 220 define what will be referred to as top and bottom surfaces 211, 221, respectively, of the body of the second embodiment 200. The rigid members 210, 220 also define surfaces 212, 222, respectively, that face toward each other. The surfaces 212, 222 have flat portions 214, 224, respectively, that are intended to extend parallel to each other, and have curved portions 216, 226 that define recesses 218, 228, respectively, that are of generally U-shape, C-shape, or semi-circular shape.

The rigid members 310, 320 of the third embodiment 300 are preferably of similar, if not completely identical, configuration. In preferred practice, the rigid members 310, 320 define what will be referred to as top and bottom surfaces 311, 321, respectively, of the body of the third embodiment 300. The rigid members 310, 320 also define surfaces 312, 322, respectively, that face toward each other. The surfaces 312, 322 have flat portions 314, 324, respectively, that are intended to extend parallel to each other, and have curved portions 316, 326 that define recesses 318, 328, respectively, that are of generally U-shape, C-shape, or semi-circular shape.

When the rigid members 110, 120 of the first embodiment 100 are moved toward each other in directions indicated by arrows 107 in FIGS. 1 and 2, the linear surface portions 114, 124 may be caused to clampingly engage. As is shown in FIGS. 1 and 2, the arrows 107 extend perpendicular to the flat surface portions 114, 124 at a time when the flat surface portions 114, 124 extend parallel to each other.

Figure 3:
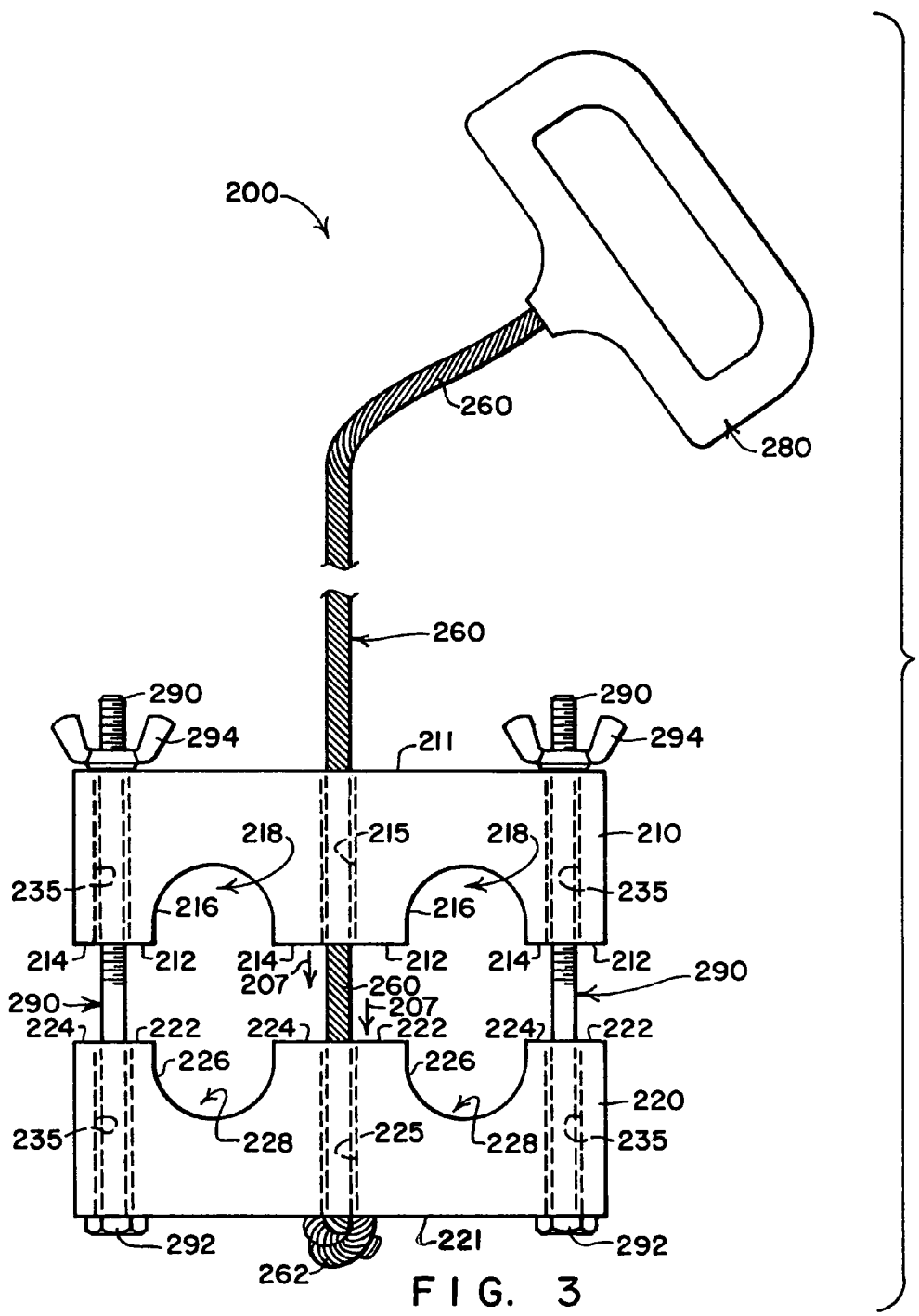
FIG. 3 is an elevational view showing a second preferred embodiment of the present invention, with a flexible tow rope or cable thereof foreshortened.
Figure 4:
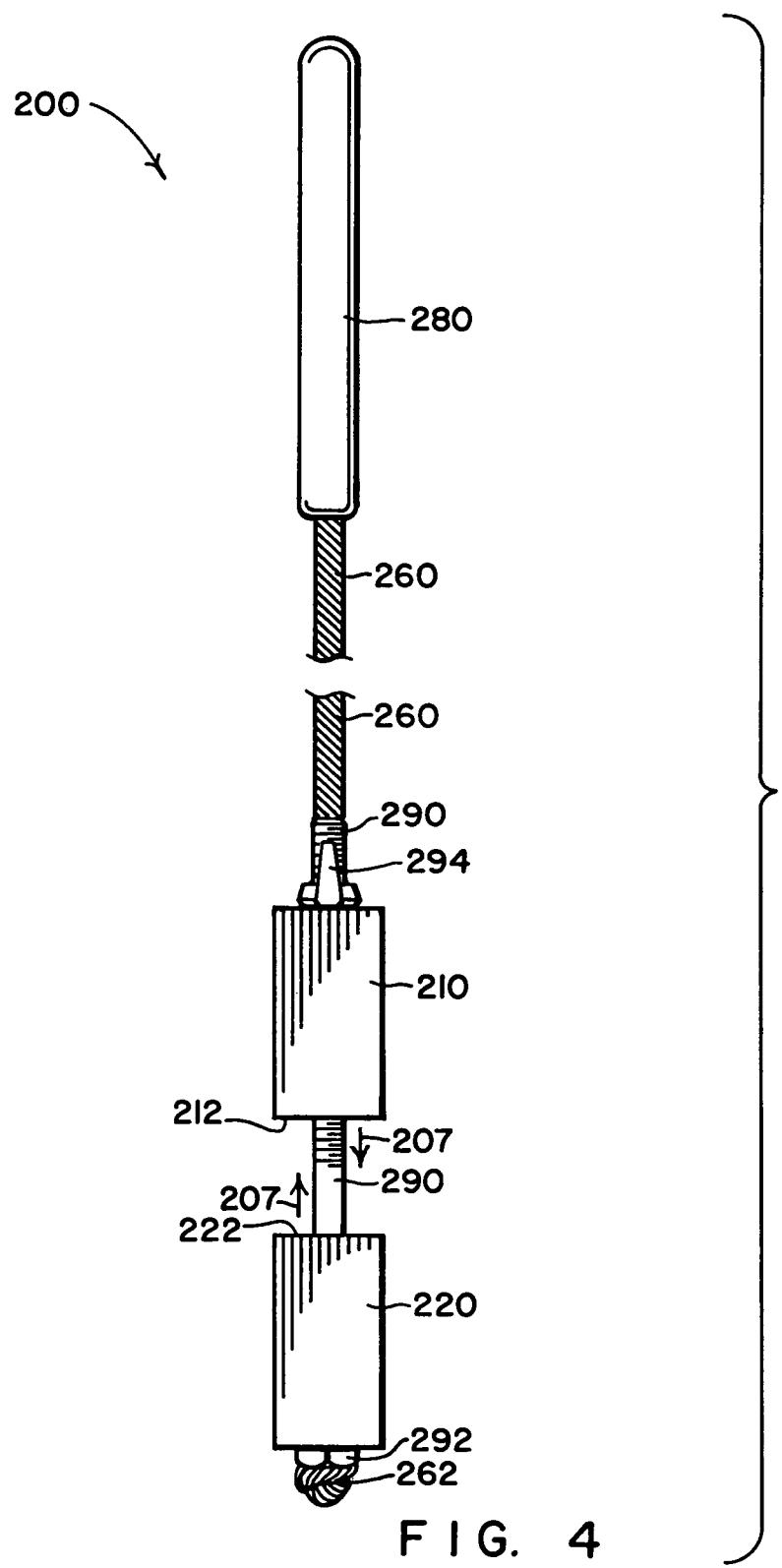
FIG. 4 is a side view thereof.

When the rigid members 210, 220 are moved toward each other in directions indicated by arrows 207 in FIGS. 3 and 4, the flat surface portions 214, 224 may be caused to clampingly engage. As depicted in FIGS. 3 and 4, the arrows 207 extend perpendicular to the flat surface portions 214, 224 at a time when the linear surface portions 214, 224 extend parallel to each other.

Figure 5:
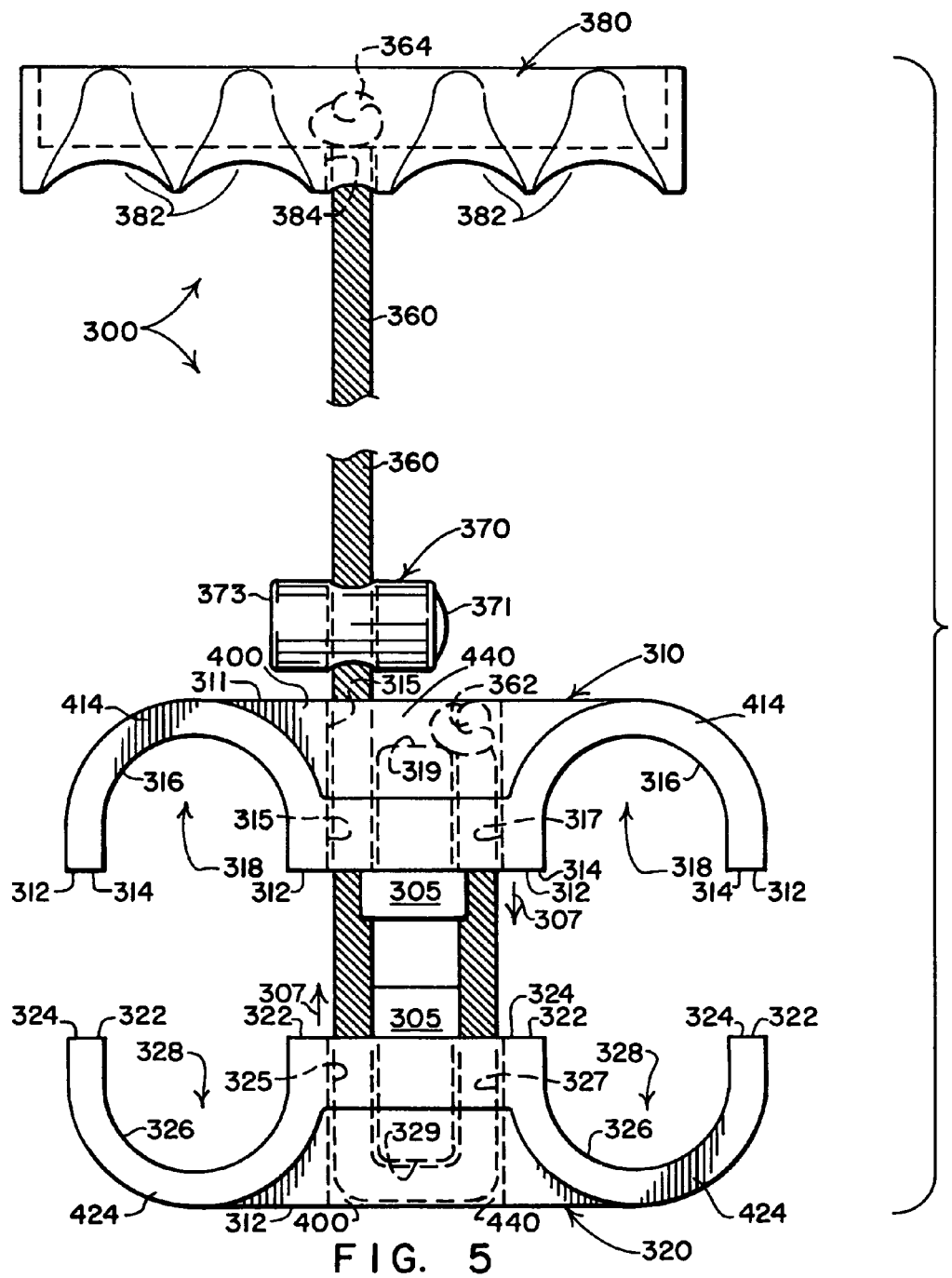
FIG. 5 is an elevational view showing a third preferred embodiment of the present invention, with a flexible tow rope or cable thereof foreshortened, and with a commercially available clamping device shown installed on the tow rope or cable.
Figure 6:
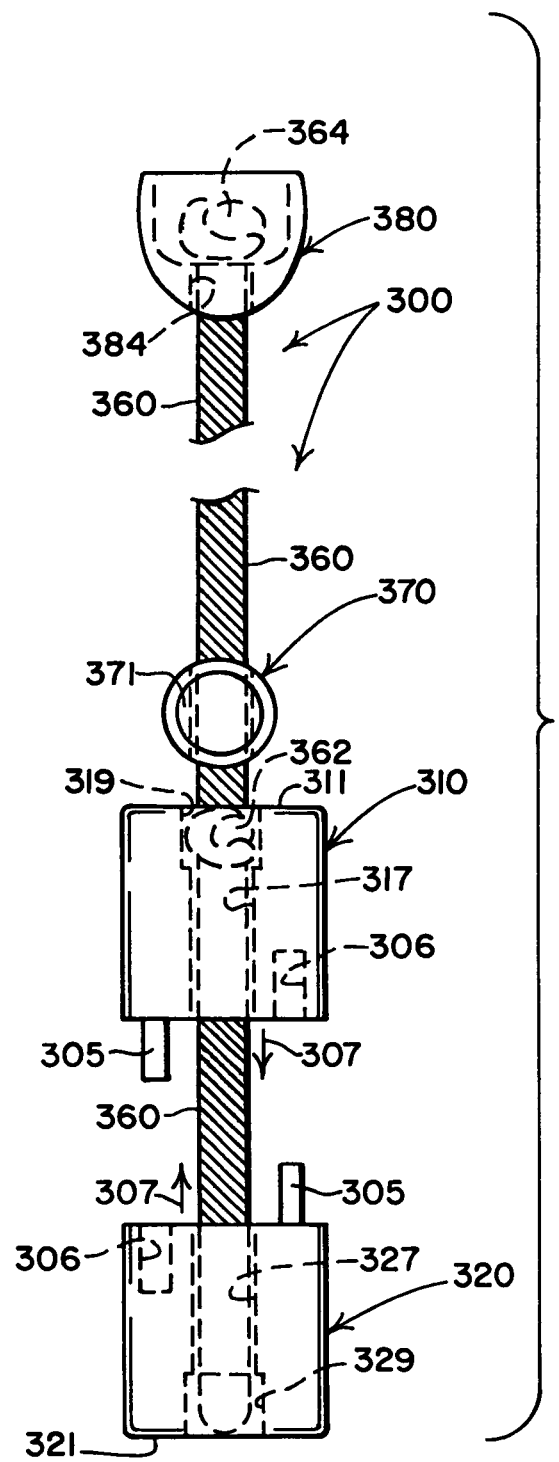
FIG. 6 is a side view thereof.

When the rigid members 310, 320 are moved toward each other in directions indicated by arrows 307 in FIGS. 5 and 6, the flat surface portions 314, 324 may be caused to clampingly engage. As is shown in FIGS. 5 and 6, the arrows 307 extend perpendicular to the flat surface portions 314, 324 at a time when the linear surface portions 314, 324 extend parallel to each other.

As can best be seen in FIG. 1, the identical rigid members 110, 120 are each provided with one generally cylindrical projection 105, and with one generally cylindrical opening 106 sized to receive the projection 105 that extends from the other of the members 110, 120. As the members 110, 120 are moved toward and draw near to each other, each of the projections 105 is received in one of the openings 106 to assist in maintaining the members 110, 120 in proper alignment with each other as they are clamped together.

As can best be seen in FIG. 3, the rigid members 210, 220 are each connected by threaded fasteners 290 that extend through aligned passages 235 to maintain alignment between the members 210, 220, and to hold the flat surface portions 214, 224 in substantially parallel relationship as the members 210, 220 are clamped together. The threaded fasteners 290 have enlarged heads 292 at their lower end regions that engage the surface 221, and have wing nuts 294 that are threaded onto upper end regions of the fasteners 290 which engage the surface 211 and can be tightened to clamp the members 210, 220 toward each other.

As can best be seen in FIG. 5, the rigid members 310, 320 are each provided with one generally rectangular projection 305, and with one generally rectangular opening 306 that is sized to receive the projection 305 that extends from the other of the members 310, 320. As the members 310, 320 are moved toward and draw near to each other, each of the projections 305 is received in one of the openings 306 to assist in maintaining the members 310, 320 in proper alignment with each other as they are clamped together.

The members 110, 120 of the first embodiment 100 have centrally located passages 115, 125, respectively, that are shown by hidden lines in FIG. 1. A flexible tow rope or cable 160 is threaded loosely through the passages 115, 125. A knot 162 or other enlargement-defining element such as a crimped-on member (not shown) that is too large to enter the passage 125 is provided on a portion of the tow rope or cable 160 that extends beyond the lower surface 121 of the rigid member 120.

The members 210, 220 of the second embodiment 200 have centrally located passages 215, 225, respectively that are shown by hidden lines in FIG. 3. A flexible tow rope or cable 260 is threaded loosely through the passages 215, 225. A knot 262 or other enlargement-defining element such as a crimped-on member (not shown) that is too large to enter the passage 225 is provided on a portion of the tow rope or cable 260 that extends beyond the lower surface 221 of the rigid member 220.

Referring to FIG. 5, the members 310, 320 of the third embodiment 300 define two sets of spaced apart yet generally centrally located aligned passages 315, 325 and 317, 327, respectively. A flexible tow rope or cable 360 is threaded loosely downwardly through the passages 315, 325, then through a cross-passage 329 that extends transversely between the passages 325, 327, then upwardly through the passages 327, 317. A knot 362 or other form of enlargement such as a crimped-on member (not shown) that is too sizable to enter the passage 317 is provided on an end region of the tow rope or cable 360 that resides in an upper end region of the passage 317 and extends part way into a cross-passage 319 that extends transversely between the passages 315 and 317.

When the two rigid members 110, 120 of the first embodiment are sufficiently separated from each other (for example, as is shown in FIGS. 1 and 2) so the generally cylindrical projections 105 do not extend into the generally cylindrical openings 106, the rigid members 110, 120 are free to turn relative to each other about an axis of the aligned passages 115, 125 and of the tow rope or cable 160—which turning capability can assist during efforts to insert narrow ankle or small leg portions of a taken game carcass into the recesses 118, 128. However, when the rigid members 110, 120 are clamped toward each other sufficiently to cause the projections 105 to extend into the passages 106, this will keep the members 110, 120 properly aligned as they move progressively toward each other while being clamped together.

The rigid members 210, 220 of the second tote embodiment 200 shown in FIGS. 3 and 4 do not have a capability to turn relative to each other about the axis of the aligned passages 215, 225 because the rigid members 210, 220 are held in alignment by the threaded fasteners 290.

When the two rigid members 310, 320 of the third embodiment are sufficiently separated from each other (for example, as shown in FIGS. 5 and 6) that the generally rectangular projections 305 do not extend into the generally rectangular openings 306, the rigid members 310, 320 are free to pivot about a quarter turn relative to each other due to the flexibility of such portions of the tow rope or cable 360 as extend between the separated members 310, 320—which turning capability can assist during efforts to insert narrow ankle or small leg portions of a taken game carcass into the recesses 318, 328. However, when the members 310, 320 are clamped toward each other sufficiently to cause the projections 305 to extend into the passages 306, the insertion of the projections 305 into the openings 306 will keep the rigid members 310, 320 properly aligned as they move progressively toward each other while being clamped together.

To clamp the members 110, 120 of the first embodiment 100 toward each other, and to retain a clamped-together relationship of the members 110, 120, a commercially available clamp assembly 170 preferably is installed on the flexible tow rope or cable 160 at a location above the upper rigid member 110. By adjusting the position of the clamp assembly 170 along the tow rope or cable 160, the first and second members 110, 120 can be forced to move relatively toward and each other, and can be retained closely together with the generally cylindrical projections 105 extending into the generally cylindrical openings 106 so a clamped-together state of the rigid members 110, 120 is maintained that grips and retains narrow ankle or small leg regions of the legs of a deer carcass or the like (not shown in the drawings hereof—however, as is shown in the previously mentioned patent to Burlison et al).

In preferred practice, the clamp assembly 170 is a type sold by The Lehigh Group of Macungie, Pa. 18062, product number 7097CL, which has an elongate, generally cylindrical, tubular body 172 into one end region of which extends a tubular plunger 174. Although the clamp assembly 170 is sold as being primarily intended for use in the tightening of sagging clothesline, the clamp assembly 170 has been found to be usable as an element of the tote 100.

The tubular housing 172 of the clamp assembly 170 encloses three steel balls (not shown) that are arrayed about the flexible tow rope or cable 160 and are pressed radially inwardly to engage and clamp the tow rope or cable 160 under the influence of a spring (not shown, but carried within the housing 172) unless a tubular plunger member 174 of the rope clamp assembly 170 is pulled axially outwardly relative to the housing 172 (in a direction as indicated by an arrow 175 in FIGS. 1 and 2) to release the clamping action of the steel balls.

To utilize the rope clamp assembly 170 to move the rigid members 110, 120 toward each other, the housing 172 is moved along the tow rope or cable 160 into engagement with the upper surface 111 of the rigid member 110. As the housing 172 of the rope clamp assembly 170 and the knot 162 clamp the rigid members 110, 120 therebetween, the members 110, 120 are forcibly moved toward each other in the direction of the arrows 107 that are shown in FIGS. 1 and 2.

To release a clamped-together relationship of the members 110, 120, the tubular plunger member 174 of the rope clamp assembly 170 is pulled axially outwardly relative to the housing 172 in the direction of the arrow 175 shown in FIGS. 1 and 2 to release the clamping engagement of the clamp assembly 170 on the flexible tow rope or cable 160.

To clamp the rigid members 210, 220 of the second embodiment 200 toward each other, and to retain a clamped-together relationship of the members 210, 220, the wing nuts 294 are tightened along the threaded fasteners 290. To release a clamped-together relationship of the rigid members 210, 220, the wing nuts 294 are loosened.

Referring to FIG. 5, the tow rope or cable 360 is threaded loosely downwardly through the aligned passages 315, 325, then transversely through the cross-passage 329, and then upwardly through the aligned passages 327, 317. Pulling upwardly on the flexible tow rope or cable 360 by applying force to a handle 380 connected to an upper end region of the tow rope or cable 360 will tend to cause the upper rigid member 310 to move relatively downwardly toward the lower rigid member 320, and will tend to cause the lower rigid member 320 to move relatively upwardly toward the upper rigid member 310. Thus, pulling on the flexible tow rope or cable 360 will cause the rigid members 310, 320 to be clamped toward each other.

To retain a clamped-together relationship of the rigid members 310, 320, a commercially available clamp assembly 370 may be installed on the tow rope or cable 360. The clamp assembly 370 is preferably of a type shown in the drawings of U.S. Pat. No. 5,711,072 issued Jan. 27, 1998 to Carpenter, the disclosure of which patent is incorporated herein by reference.

Normally, the clamp assembly 370 grips the tow rope or cable 360. However, when opposite end regions 371, 373 of the clamp assembly 370 are pressed toward each other, the clamp assembly 370 releases its grip on the tow rope or cable 360, thereby permitting the clamp assembly 370 to be moved along the tow rope or cable 360. For example, the clamp assembly 370 can have its opposite end regions 371, 373 pressed toward each other to permit the clamp assembly 370 to be moved downwardly along the tow rope or cable 360 and into engagement with the rigid member 310, whereupon the end regions 371, 373 are released to permit the clamp assembly 370 to grip the tow rope or cable 360 to hold the rigid members 310, 320 in a clamped-together relationship that has been created by pulling on the tow rope or cable 360.

To release a clamped-together relationship of the members 310, 320, the opposite end regions 371, 373 of the clamp assembly 370 are pressed toward each other which again causes the assembly 370 to release its grip on the tow rope or cable 360 so the clamp assembly 370 can be moved upwardly along the tow rope or cable 360 away from the rigid members 310, 320 to release the clamped-together relationship of the members 310, 320.

The tow ropes or cables 160, 260, 360 are preferably of about one-fourth inch in diameter, and preferably have a length of about thirty six inches. The passages 115, 125 and 215, 225 and 315, 325, 329, 327 and 317 through which the tow ropes or cables 160, 260, 360 are threaded, respectively, are sized to permit the tow ropes or cables 160, 260, 360 to move freely therethrough. In preferred practice, the cross-passages 319, 329 (FIG. 5) of the third embodiment 300 are preferably somewhat wider than are the uniform diameters of the passages 315, 325, 317, 327—which permits the knot 362 (best shown in FIG. 5) to be sufficiently large to be unable to enter the passage 317 (or to enter either of the passages 325, 327 if the rigid members 310, 320 are reversed so that the member 310 is positioned to be the lower of the two rigid members 310, 320, and the member 320 is positioned to be the upper of the members 310, 320, hence the knot 362 is seated in one or the other of the cross-passages 319 or 329, and needs to be prevented from entering one or the other of the adjacent passages 325, 327).

When the two rigid members 110, 120 of the first embodiment 100 are moved relatively toward each other, the substantially U-shaped, C-shaped or semi-circular recesses 118 of the first rigid member 110 align with and are intended to cooperate with the two spaced, substantially U-shaped, C-shaped or semi-circular recesses 128 of the rigid member 120. If the members 110, 120 were to be clamped completely together, the recesses 118, 128 would then cooperate to provide a pair of spaced, substantially circular formations (typically of a diameter of about 1.25 inches) that preferably are suitably sized to receive, to grip, and to retain therein narrow ankle or small leg regions of the legs of a deer or other taken animal carcass.

The recesses 218, 228 of the second embodiment 200 and the recesses 318, 328 of the third embodiment 300 are preferably configured and sized substantially as has just been described in conjunction with the recesses 118, 128 of the first embodiment 100. However, if hunters are taking larger four legged game than deer, the rigid members 110, 120 and 210, 212 and 310, 312 can, of course, be provided with somewhat larger radius recesses 118, 128 and 218, 228 and 318, 328, respectively, that can cooperate to provide larger radius recess formations capable of receiving, gripping and retaining the somewhat larger ankle or leg regions of taken game. Likewise, if the tote 100 is to be used to drag somewhat smaller game carcasses, the recesses 118, 128 and 218, 228 and 318, 328 can be sized somewhat smaller.

In FIGS. 1 and 2, and in FIGS. 3 and 4, commercially purchased handles 180, 280 are shown connected to an end region of the flexible tow ropes or cables 160, 260, respectively. In FIGS. 5 and 6, a somewhat less costly injection molded handle 380 of open construction is provided. The handle 380 has finger-receiving grip formations 382 (shown in FIG. 5) and has a central opening 384 through which an end region of the flexible tow rope or cable 360 extends and carries a knot 364.

By pulling on one of the handles 180, 280, 380 and hence on the tow ropes or cables 160, 260, 360, the first, second and third tote embodiments 100, 200, 300, respectively, can be used to drag a game carcass that has narrow ankle or small leg regions of two of its legs (not shown, but in a manner shown in the previously referenced Burlison et al patent) received in and securely gripped by the recesses 118, 128 or 218, 228 or 318, 328, respectively.

Although not depicted in the drawings, the tote embodiments 100, 200, 300 may, in fact, be provided with two pairs or sets of the rigid members 110, 120 and 210, 220 and 310, 320, respectively, at spaced locations along the tow ropes or cables 160, 260, 360, respectively, so that, for example, narrow ankle or small leg regions of front legs of a taken game carcass can be inserted in a first set or pair of the rigid members 110, 120 or 210, 220 or 320, 330, and narrow ankle or small leg regions of rear legs of the taken game carcass can be inserted in a second set or pair of the rigid members 110, 120 or 210, 220 or 310, 320, respectively. If two sets or pairs of the rigid members 110, 120 or 210, 220 or 310, 320 are deployed on the same tow rope or cable 160, 260, 360, respectively, the tow ropes or cables 160, 260, 360 preferably are longer than a normal length of about 36 inches; separate clamp assemblies 170 are be provided for use with each set or pair of the rigid members 110, 120 of the first embodiment 100; and separate clamp assemblies 370 are provided for use with each set or pair of the rigid members 310, 320 of the third embodiment 300.

Figure 7:
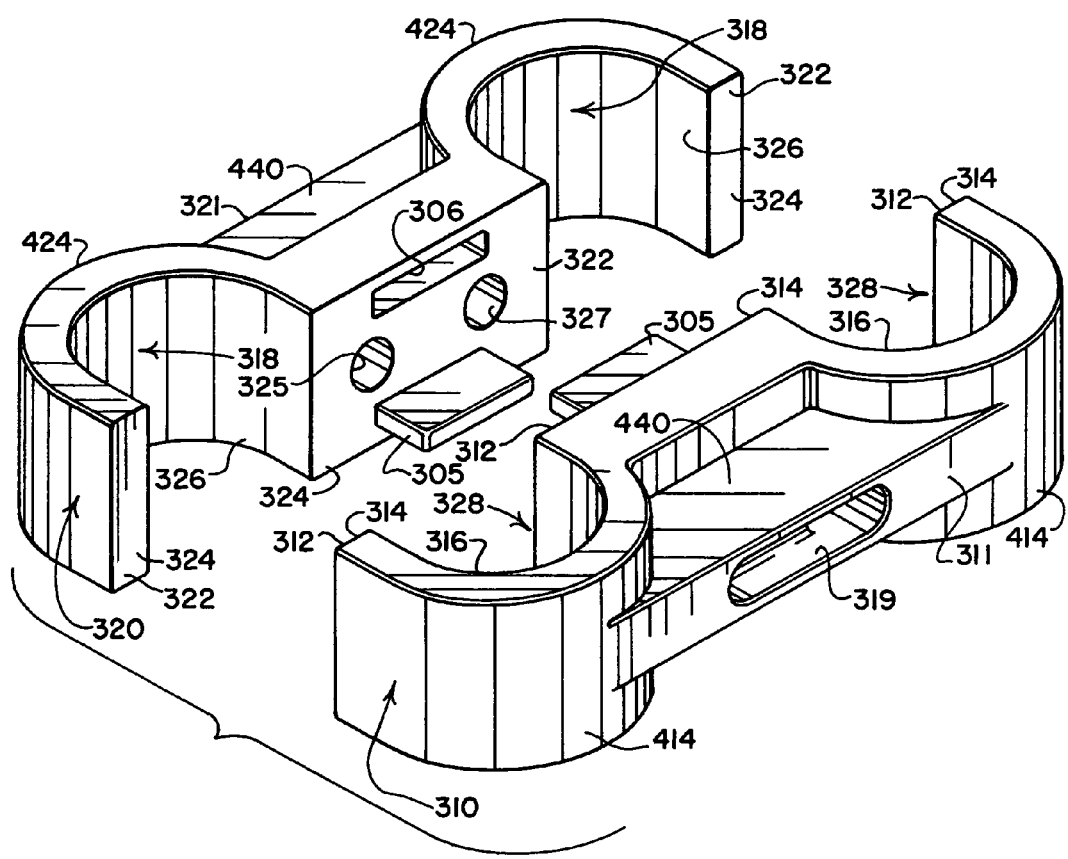
FIG. 7 is an enlarged perspective view showing two identical rigid members that form a tote body of the third embodiment of the invention.

Referring to FIG. 7 in conjunction with FIGS. 5 and 6, the identical rigid members 310, 320 of the third embodiment 300 can be seen to have a relatively long central region 400 that bridges between two identically curved portions 414, 424 that define the substantially U-shaped, C-shaped or semi-circular recesses 318, 328. The generally rectangular alignment projections 305 extend from the central regions 400, and the mating openings 306 are formed in the central regions 400 at short distances spaced from the projections 305. Reinforcing formations 440 also bridge between the curved portions 414, 424 which define the recesses 318, 328, to ensure that the curved portions 414, 424 do not deform or break while in use.

As will be apparent from the foregoing description, various alternate forms of totes that utilize pairs rigid members (that resemble the rigid members. 110, 120 or 210, 220 or 310, 320) that can be clamped toward each other to receive and grip narrow ankle or small leg regions of at least two legs of a taken game carcass can incorporate the pith and thrust of the present invention without conforming precisely to the configuration of the embodiments 100, 200, 300 that are described in the specification and depicted in the drawings hereof.

Although the invention has been described in a preferred form with particularity, it is understood that the present disclosure of embodiments have been made only by way of example, and that numerous changes in the details of construction and the combination and arrangement of parts may be resorted to without departing from the spirit and scope of the invention.

What is claimed is:

1. A tote comprised of two substantially identical rigid members that can be moved relatively toward each other while side-by-side recesses of one of the rigid members opens toward and cooperates with the side-by-side recesses of the other of the rigid members to cooperatively define portions of two side-by-side openings configured to receive, to grip and to releasably retain therein relatively narrow portions of two legs of a game carcass, wherein each of the rigid members also defines one of a first pair of aligned passages through which an elongate flexible tow cable is able to extend for dragging the game carcass, wherein at least one of the rigid members defines one of the first pair of aligned passages to vary in size to define a wider portion and a narrower portion, wherein the wider portion is able to retain an enlargement formed on an end of the tow cable, and wherein the narrower portion is too narrow to allow the enlargement to pass therethrough.

2. The tote of claim 1 additionally including a handle able to be connected to the elongate flexible tow cable, wherein the handle is configured to be gripped and pulled to drag the game carcass from one location to another.

3. The tote of claim 1 wherein each of the rigid members defines one of a second pair of aligned passages to enable the flexible tow cable to extend through the first pair of aligned passages and through the second pair of aligned passages.

4. The tote of claim 3 wherein the enlargement formed on the end region of the elongate flexible tow cable comprises a knot.

5. The tote of claim 1 wherein the elongate flexible tow cable forms at least an element of a clamping means for clamping the rigid members toward each other.

6. The tote of claim 5 wherein the clamping means includes retaining means through which the flexible tow cable extends that is engageable with one of the rigid members to resist relative movement of the rigid members away from each other.

7. The tote of claim 6 wherein the retaining means includes a clamping assembly for gripping the flexible tow cable.

8. The tote of claim 1 wherein each of the rigid members defines a projection configured to be received in an opening defined by the other of the two rigid members to assist in aligning the two rigid members during relative movement of the rigid members toward each other.

9. The tote of claim 1 wherein the first and second recesses are of substantially identical semi-circular shape.

10. A tote for dragging a game carcass, including first and second substantially identically configured rigid members that that can be clamped toward each other to bring a substantially C-shaped first recess defined by the first member toward and into alignment with a substantially C-shaped first recess defined by the second member, with the first recess defined by the first member being configured to cooperate with the first recess defined by the second member so the first recesses can cooperate to receive, grip and retain therein a first relatively narrow ankle region of one leg of a taken carcass, wherein each of the first and second members defines a pair of through passages that are aligned with the pair of through passages defined by the other of the first and second members to bring the first recess defined by the first member into alignment with first recess defined by the second member, and wherein each of the first and second members defines a cross-passage in a surface of each of the first and second members to connect the pair of through passages defined by each of the first and second members.

11. The tote of claim 10 wherein each of the first and second members defines a second recess substantially identical to the first recess defined thereby, with the second recesses being configured to cooperate to receive, grip and retain therein a second relatively narrow ankle region of another leg of the taken carcass, and with the tote additionally including clamping means for moving the first and second members relatively toward a position of engagement, wherein the clamping means is to extend through both pairs of through passages of both the first and second members, and wherein the clamping means is to extend along the cross-passage defined in a surface of at least one of the first and second members.

12. A tote for dragging a game carcass, comprising first and second rigid members that have first and second surfaces, respectively, that are movable toward each other when the first and second members are clamped toward each other, with the first surface of the first member having first and second leg receiving recesses opening therethrough at spaced locations that substantially align with first and second leg receiving recesses defined by the second member that open at spaced locations through the second surface when the first and second members are clamped relatively toward each other, with the first and second members also defining aligned passages through the first and second surfaces at locations between the first and second leg receiving recesses through which clamping means extends that can be used to aid in clamping the first and second members toward each other, and with the first member defining a projection extending from the first surface at a location between the first and second leg receiving recesses to be received in an opening defined in the second surface at a location between the first and second leg receiving recesses of the second member to assist in aligning the first and second rigid members during relative movement of the first and second rigid members toward each other.

13. The tote of claim 12 wherein the first and second members are substantially identically configured.

14. The tote of claim 12 wherein the clamping means includes an elongate flexible tow cable.

15. The tote of claim 14 additionally including a handle connected to the elongate flexible tow cable, wherein the handle is configured to be gripped and pulled to drag the game carcass from one location to another.

16. The tote of claim 12 wherein the aligned passages include two sets of aligned passages, and the clamping means extends through both of the two sets of aligned passages.

17. A tote for grasping two legs of a game carcass to aid in dragging the carcass, comprising first and second rigid members 1) that define first and second surfaces, respectively, and 2) that are movable toward each other when clamping means that extends through aligned passages defined by the first and second members, respectively, is used to move the first and second members relatively toward each other, with at least one of the first and second surfaces being configured to cooperate with the other of the first and second surfaces to grasp two legs of a game carcass when the clamping means moves the first and second members relatively toward each other, with the aligned passages defined to extend through the first and second surfaces at locations between locations at which the two legs are grasped, and with a projection extending from one of the first and second surfaces at a location between the locations at which the two legs are grasped to be received in an opening defined in the other of the first and second surfaces at a location between the locations at which the two legs are grasped.

18. The tote of claim 17 in which the clamping means is capable of moving the first and second surfaces toward and into engagement with each other.

19. The tote of claim 17 in which the first and second surfaces are configured to substantially parametrically encircle the two legs when the first and second surfaces are moved toward a position of engagement with each other.

20. The tote of claim 17 wherein the clamping means includes a flexible tow cable, and the tote additionally includes a handle connected to the elongate tow cable, wherein the handle is configured to be gripped and pulled to drag the game carcass from one location to another.

21. A tote comprising first and second substantially identically configured rigid members each defining a first and a second generally C-shaped recess that opens toward, aligns with, and communicates with a corresponding one of first and second generally C-shaped recesses defined by the other of the first and second rigid members when the first and second rigid members are moved relatively toward each other while substantially maintaining alignment of a first set of through passages including a separate through passage defined by each of the first and second members at aligned locations between the first and second generally C-shaped recesses; an elongate, flexible tow cable extending through the aligned first set of through passages, with one end region thereof connected to a selected one of the first and second members through an enlargement formed on the end region which is able to be retained within a wider portion of one through passage of the first set of through passages, but which cannot pass through a narrower portion of the one through passage; and a grippable handle connected to the tow cable near an opposite end region thereof.

22. The tote of claim 21 additionally including at least a first formation on the first rigid member, and at least a second formation on the second rigid member that interfit when the first and second rigid members are relatively moved near to and into engagement with each other to aid in maintaining alignment of corresponding ones of the recesses as the first and second rigid members are moved near to and into engagement with each other.

23. The tote of claim 21 additionally including means for clamping the first and second members toward engagement with each other.

24. The tote of claim 23 wherein the means for clamping includes a length of the tow cable that extends through a second set of aligned through passages spaced from the first set of aligned through passages.

25. The tote of claim 23 additionally including a clamp assembly installed on the tow cable and being releasably movable therealong.

26. A tote comprising first and second substantially identically configured rigid members each defining a pair of side-by-side, spaced-apart, generally C-shaped recesses between which is located a pair of through passages, with the recesses and the pair of through passages all opening through a surface of one of the first and second members that faces toward a substantially identical surface of the other of the first and second members; a length of flexible tow cable having a grippable handle connected thereto near one end region of the tow cable, and having an opposite end region extending through both of the pairs of through passages and serving to assist in aligning the C-shaped recesses and the pair of through passages of the first member with the C-shaped recesses and the pair of through passages of the second member when the first and second members are moved toward each other; with the opposite end region of the flexible tow cable being connected to a selected one of the first and second members.

* * * * *